United States Patent [19]
Kempton

[11] Patent Number: 4,756,401
[45] Date of Patent: Jul. 12, 1988

[54] LOAD TRANSFER APPARATUS FOR POWER-DRIVEN OVERHEAD CONVEYOR

[75] Inventor: Thomas D. Kempton, Vienna, Va.

[73] Assignee: Hopeman Brothers, Inc., Waynesboro, Va.

[21] Appl. No.: 17,246

[22] Filed: Feb. 20, 1987

[51] Int. Cl.[4] .................. B65G 37/00; B65G 43/00
[52] U.S. Cl. .................. 198/468.6; 104/96; 198/463.3; 198/486.1; 198/680; 414/336; 414/348; 414/397
[58] Field of Search ............. 198/468.6, 486.1, 465.4, 198/680, 463.3, 485.1, 678; 104/96, 100, 130, 131, 93; 414/346, 347, 348, 331, 336, 397, 267, 139, 265, 786; 17/44, 44.2

[56] References Cited

U.S. PATENT DOCUMENTS

| | | |
|---|---|---|
| 865,263 | 9/1907 | Moe . |
| 2,156,248 | 4/1939 | Wegner .................. 198/20 |
| 2,609,083 | 9/1952 | Leach .................... 198/177 |
| 2,623,626 | 12/1952 | Ditolla ................... 198/21 |
| 2,658,610 | 11/1953 | Winslow ................ 198/232 |
| 2,679,810 | 6/1954 | Schutt .................... 104/93 |
| 2,716,479 | 8/1955 | Coder et al. ........... 198/680 |
| 2,854,159 | 9/1958 | Abbey . |
| 3,055,311 | 9/1962 | Sgriccia et al. ........ 104/93 |
| 3,058,604 | 10/1962 | Harper et al. . |
| 3,092,270 | 6/1963 | Slamar et al. . |
| 3,141,560 | 7/1964 | Rink . |
| 3,207,337 | 9/1965 | Abbey . |
| 3,403,799 | 10/1968 | Sindzinski et al. . |
| 3,471,040 | 10/1969 | Field ...................... 414/139 |
| 3,799,317 | 3/1974 | Shibata et al. . |
| 4,169,529 | 10/1979 | Hunter .................. 198/465.4 |
| 4,346,799 | 8/1982 | Dunville et al. ...... 198/485.1 |
| 4,423,808 | 1/1984 | Venturelli ............. 198/468.6 |

FOREIGN PATENT DOCUMENTS

| | | | |
|---|---|---|---|
| 1019881 | 1/1953 | France ................. | 414/346 |
| 2093099 | 8/1982 | United Kingdom ... | 104/93 |

Primary Examiner—Robert J. Spar
Assistant Examiner—Jennifer L. Doyle
Attorney, Agent, or Firm—Howson and Howson

[57] ABSTRACT

Load bars are transferred, in loaded condition, to or from the hangers of an overhead conveyor by a load transfer apparatus having a pair of parallel tracks approaching the power-driven conveyor path perpendicularly. The parallel tracks guide manually movable trolleys toward the power-driven conveyor path. The ends of these tracks nearest the power-driven conveyor are pivotable downwardly. To transfer a load from the manual trolleys to the power conveyor, the power conveyor is stopped, suspension chains of the power conveyor trolleys are hooked to the load bar, and the pivoted track sections are lowered until the suspension chains of the power-driven trolleys bear the load. Suspension chains of the manually movable trolleys can then be disconnected from the load bar, and the manual trolleys are removed from the tracks for reuse.

The tracks are designed with flanges which prevent removal of the manual trolleys except at specified locations.

A control circuit includes a position switch which automatically stops the power conveyor at a position in which transfer can take place. The circuit also includes safety switches to disable the power conveyor when the pivoted tracks are lowered, and also when manual trolleys are at the transfer location.

18 Claims, 5 Drawing Sheets

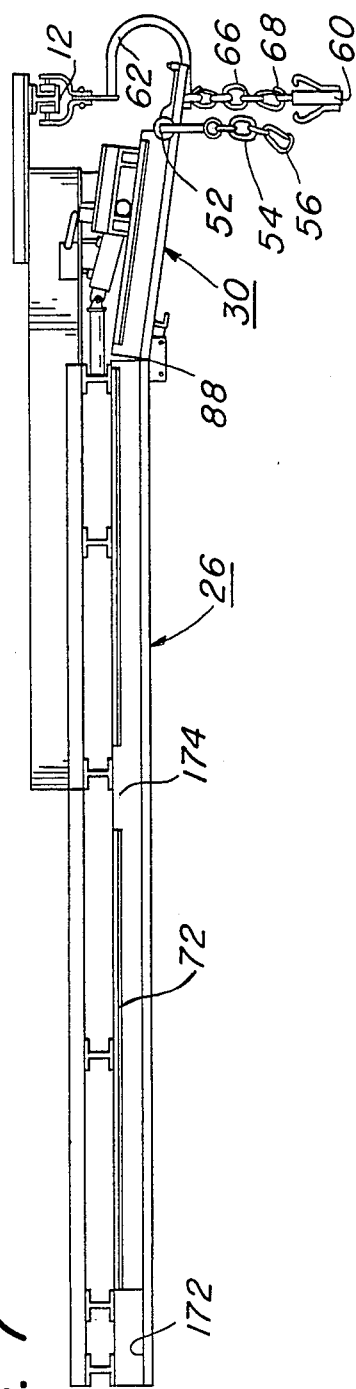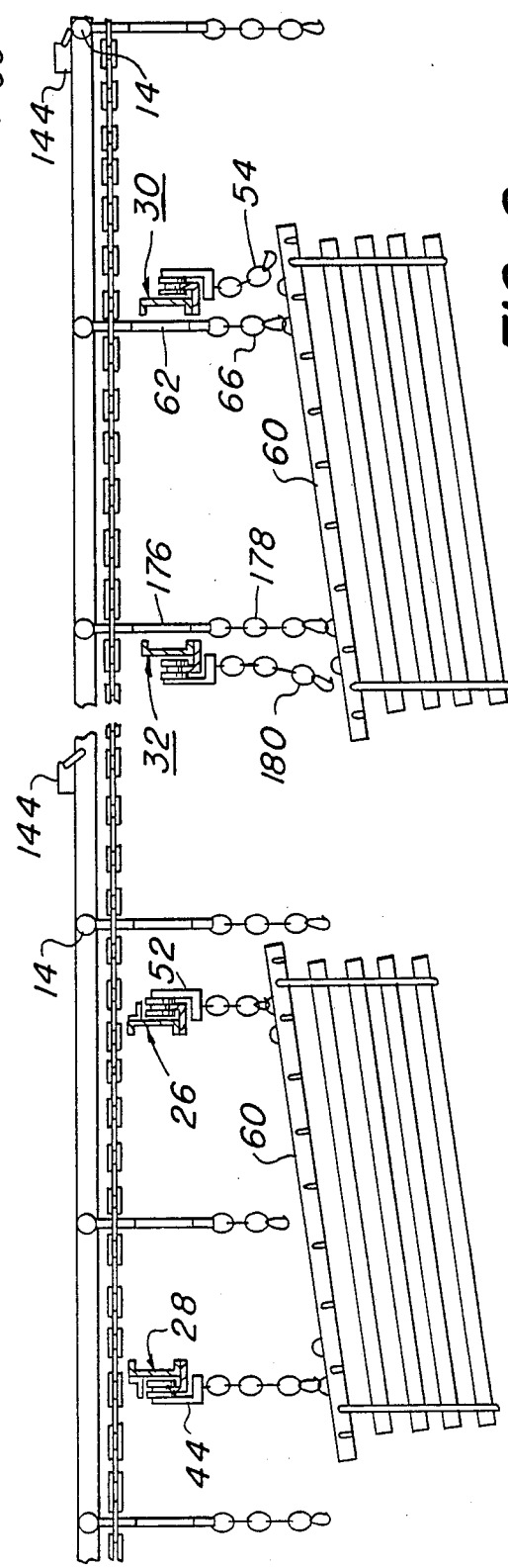

LOAD TRANSFER APPARATUS FOR POWER-DRIVEN OVERHEAD CONVEYOR

BRIEF SUMMARY OF THE INVENTION

This invention relates to a load transfer device for power-driven overhead conveyors, and particularly to a device for loading and unloading overhead conveyors of the type comprising a plurality of power-driven work-suspending trolleys movable in succession along a raised conveyor track. Such conveyors are used, for example, to carry sheet metal parts through the various stages of a paint system, including degreasing, cleaning, electrodeposition, painting and drying stages.

In a typical overhead conveyor system, the load is held on load bars, which are elongated metal bars each of which is suspended near one end from one conveyor trolley, and near its other end from an adjacent conveyor trolley. The load bars are attached to the trolleys by flexible chains having hooks at their lower ends. These hooks have snap closures for safety, and are attachable to eyes on the load bars.

In a typical sheet metal painting operation, the load bars remain attached to the overhead conveyor trolleys, and are loaded while the conveyor is moving. Where small sheet metal parts are being painted, it takes a long time to load a given load bar. Consequently, many bars go through the pain line only partially loaded. It is possible to stop the conveyor to allow the load bars to be more fully loaded. However, it is not possible simply to stop the part of the conveyor being loaded. The entire conveyor must be stopped, and consequently the overall efficiency of the paint line is impaired.

When loading heavier items onto the load bars, regardless of whether the conveyor is stopped or moving, injuries to workers, particularly back injuries, can occur due to the weight of the materials being handled. The use of hoists to load heavy materials onto the load bars is too time-consuming.

The principal object of this invention is to improve the efficiency of operation in a power-driven conveyor system by permitting load bars to be loaded while in a stationary condition, and causing the loaded bars to be transferred to the power-driven conveyor with a minimum of interruption to the operation of the conveyor.

It is also an object of the invention to provide for efficient unloading of a power-driven conveyor by the same or a similar load transfer apparatus.

A further object of the invention is to provide a load transfer apparatus which is simple, inexpensive, and safe to operate.

A still further object of the invention is to provide a load transfer apparatus which permits heavy articles to be loaded onto a load bar by means of a power-driven hoist, to avoid as much as possible interfering with the operation of the power-driven conveyor when transfer takes place.

The load transfer apparatus of the invention is situated adjacent to a power-driven conveyor system comprising a raised conveyor track, and a plurality of power-driven work-suspending trolleys movable in succession along the track for carrying work along a path. The load transfer apparatus comprises a stationary track section extending substantially horizontally toward a location on the path of the power conveyor and generally perpendicular to the direction of movement of the power-driven work-suspending trolleys at said location. A second track section is positionable at one end of the first track section in alignment therewith. When the track sections are in alignment, the second track section extends from said end of the stationary track section toward the path of movement of the work suspended from the power-driven trolleys. The second track section has an end portion extending underneath the raised conveyor track.

Means are provided for moving the end portion of the second track section downwardly from the position in which the stationary track section and the second track section are in alignment. Manually movable work-suspending trolleys are movable along the stationary track section to the second track section when the sections are in alignment. Both the power-driven trolleys and the manually movable trolleys have work attaching means extending downwardly therefrom. The system includes a load bar or similar load carrier having means detachably connectable to both of the work attaching means. The work attaching means on the power-driven trolleys are flexible and of lengths such that, when the manually movable trolleys are located at the end portion of the second track section, and both work attaching means are connected to the load carrier, the end portion of the second track section is movable downwardly through a position in which the weight of the load carrier and any load thereon is transferred from the manually movable trolleys to the power-driven trolleys.

Thus, transfer of a loaded load carrier to the power-driven conveyor system can be carried out by temporarily stopping the conveyor, moving the load laterally to a position underneath the path of the power-driven work-suspending trolleys, connecting the flexible work attaching means of the power-driven trolleys to the load carrier, lowering the end portion of the second track section, thereby causing the load carrier to descend. The work attaching means connecting the load carrier to the power-driven trolleys becomes taut, and the work attaching means connecting the load carriers to the manually movable trolleys becomes sufficiently loose that it can be detached. The manually movable trolleys are detached, the second track section is moved upwardly, and the power-driven conveyor system restarted. Unloading of the power-driven conveyor can be accomplished by reversing this procedure. In practice, it has been determined that transfer of a load bar can be effected by a skilled operator in approximately 30 seconds, thus avoiding serious interruptions to the operation of the power-driven conveyor system.

Further objects, details and advantages of the invention will be apparent from the following detailed description, when read in conjunction with the drawings.

BRIEF DESCRIPTION OF THE DRAWINGS

FIG. 7 is a side elevation of the transfer apparatus, showing the elevator in the lowered position;

FIG. 8 is a schematic elevational view showing the relationship between the power conveyor and the transfer apparatus before transfer takes place;

FIG. 9 is a schematic elevational view, similar to FIG. 8, but showing the relationship between the transfer apparatus and the power conveyor just after transfer takes place.

DETAILED DESCRIPTION

Figure 1:
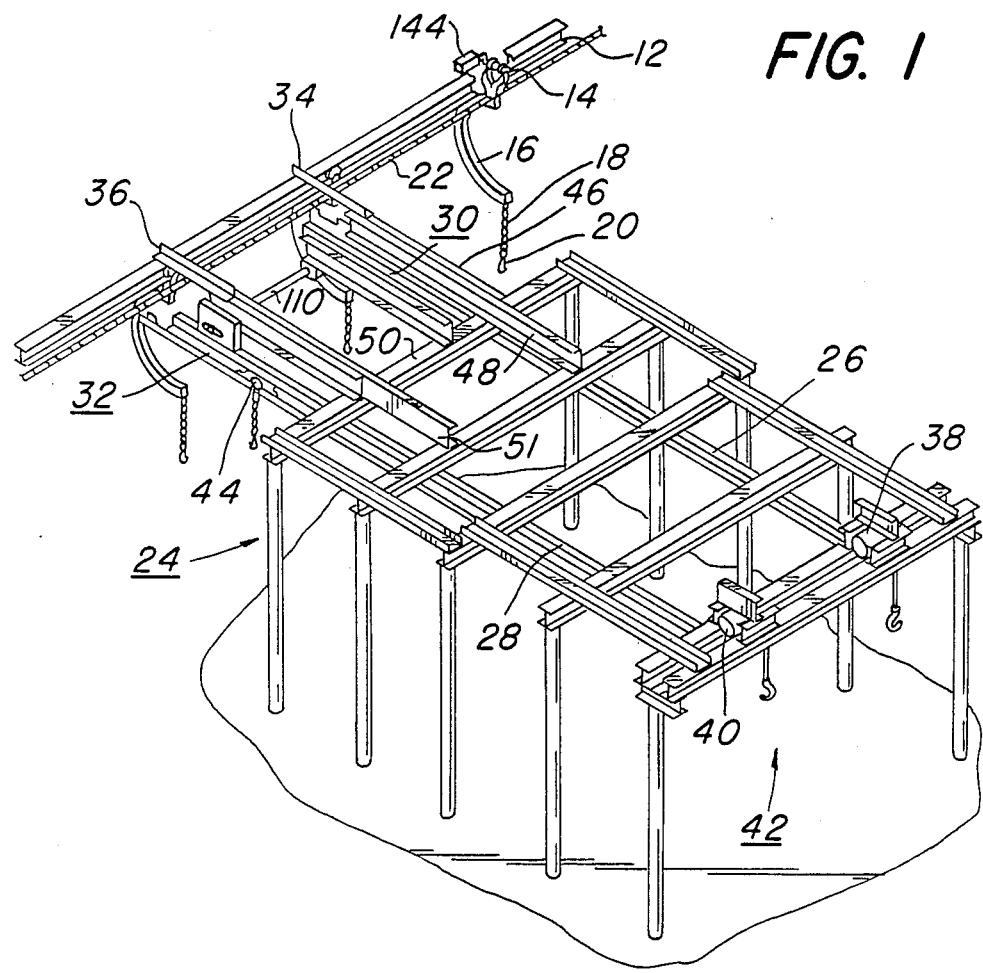
FIG. 1 is a perspective view showing a portion of a power-driven conveyor, and a load transfer apparatus in accordance with the invention.

As seen in FIG. 1, the power-driven conveyor comprises an overhead track 12, on which work suspending conveyor trolleys travel. In the case of a painting system, the track forms a loop which extends through degreasing, cleaning, electrodeposition, painting and drying stations. The power-driven trolleys are preferably uniformly spaced and substantially similar. One such trolley, shown in FIG. 1, comprises a wheel 14 which rides along track 12, a C-shaped hanger 16, and a chain 18 which extends downwardly from the lower part of the hanger and terminates in a hook 20. In a typical sheet metal painting operation, sheet metal parts are suspended on load bars. Each load bar is suspended from two adjacent trolleys. The chains of adjacent trolleys may be of different lengths, causing the load bars and the parts to be painted to tilt so that excess paint flows toward one end of each part being painted for more uniform quality. The hangers are C-shaped to accommodate shields which are located in various stages of the painting operation to protect the parts from grease falling from the conveyor track.

The trolleys are all connected to a continuous, moving drive chain 22, which travels underneath track 12.

The load transfer apparatus includes a frame 24 having parallel rails approaching the power conveyor in a direction generally perpendicular to its direction of travel. These rails are supported by frame 24, and comprise a stationary track section consisting of rails 26 and 28, and an elevator track section consisting of rails 30 and 32. The rails of the elevator track section are arranged as continuations of the rails of the stationary track section. The ends of the rails of the elevator track section extend underneath track 12, and are normally at a level such that they extend into the clear space in the openings of the C-shaped hangers as the hangers pass by the transfer apparatus. The elevator track section pivots so that the ends underneath track 12 are downwardly during the transfer operation which will be described. Downward pivoting movement is effected by cams operated by a hydraulic cylinder. As shown in FIG. 1, the overhead beam structure of frame 24 is connected to track 12 by L-shaped beams 34 and 36.

At the rear ends of stationary rails 26 and 28, electrically operated hoists 38 and 40 are provided for the purpose of loading heavy articles onto the stationary track section. Frame 24 is designed with a clear open space 42 underneath its overhead framework so that articles can be loaded onto load bars suspended from the stationary tracks section, and temporarily stored in this space before the load bars are transferred to he power-driven conveyor.

Manually movable trolleys can be suspended on and moved along the rails of the stationary and elevator track sections. One such trolley, consisting of a wheel, a suspension chain, and a hook, is indicated in FIG. 1 at 44 on elevator rail 32.

Figure 2:
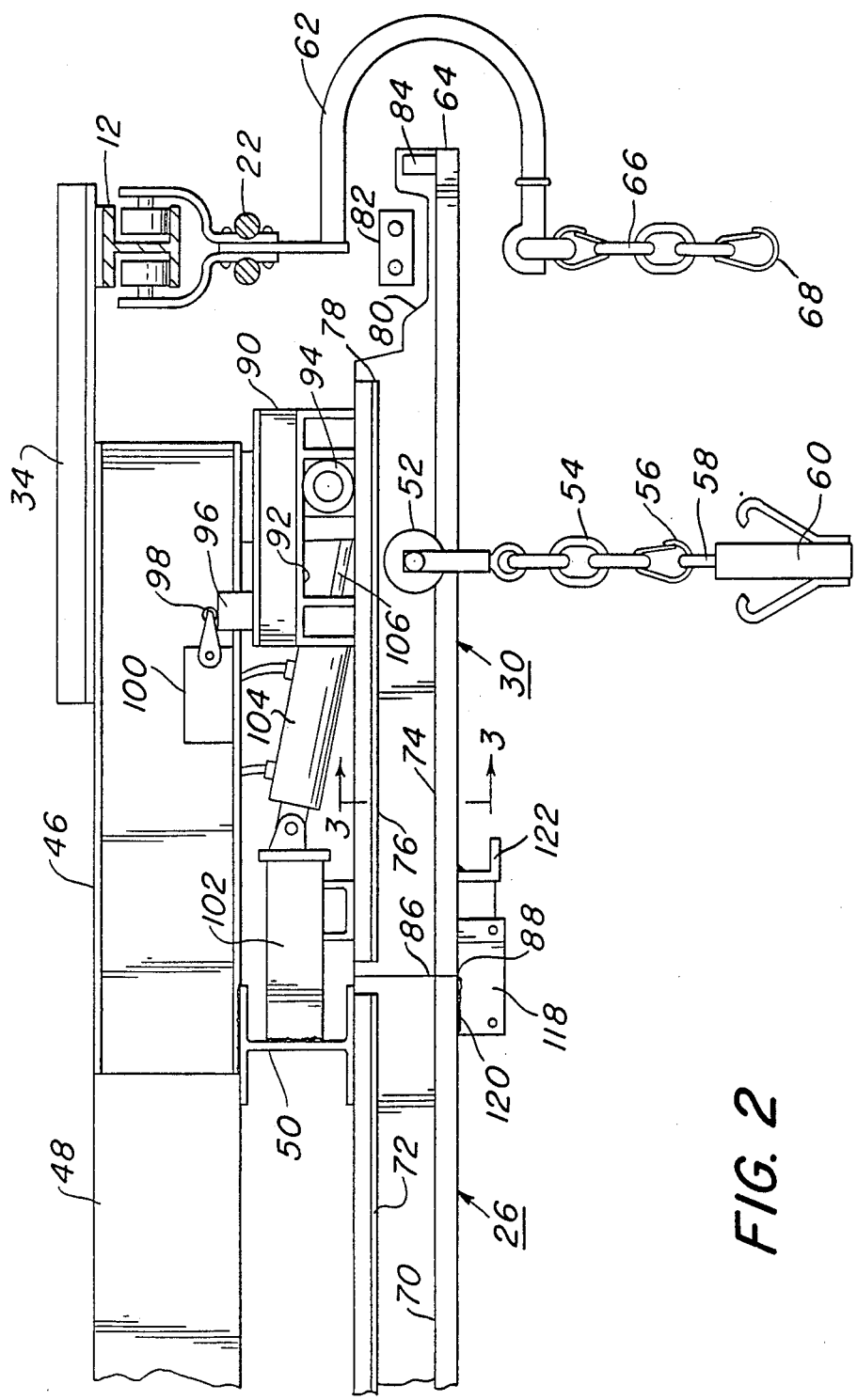
FIG. 2 is a fragmentary side elevation of the elevator portion of the transfer apparatus, showing its relationship to the power-driven conveyor.

FIG. 2 shows the elevator portion of the transfer apparatus, as viewed from the upper, right-hand side of FIG. 1. Rails 30 and 26 are suspended from longitudinal overhead beams 46 and 48, both of which are connected to track 12 by beam 34. An I-beam 50 extends underneath beam 48 in a transverse direction and connects the front end of stationary rail 26 to beam 48. The same I-beam 50 extends to the opposite stationary rail 28 (FIG. 1), and connects rail 28 to longitudinal beam 52.

FIG. 2 shows a trolley wheel 52 riding on elevator rail 30. Trolley wheel 52 has a load bar 60 suspended from it through a flexible chain 54, hook 56 and load bar eye 58. A corresponding trolley (not shown in FIG. 2) on the opposite elevator rail, is connected to another eye on load bar 60.

Rail 30 extends underneath power conveyor track 12. The C-shaped hangers of the power conveyor provide clearance for the ends of the elevator rails. Thus, as shown in FIG. 2, C-shaped hanger 62 extends around end 64 of rail 30. A chain 66 extends downwardly from the lower part of hanger 62, and terminates in a hook 68. Hook 68 is somewhat below the level of hook 56 when the rails of the elevator tracks are horizontal.

Rail 26 has a flange 70 with a vertical portion on which trolley 52 can travel. It also has an overhanging flange 72 which prevents accidental removal of the trolleys from the rail. Rail 30 has similar flanges 74 and 76. Flanges 70 and 74 are aligned with each other when the elevator rails are horizontal, as shown in FIG. 2. The configuration of the flanges can be seen in FIG. 3.

As shown in FIG. 2, overhead flange 76 terminates at 78, but flange 74, on which the trolleys travel, extends beyond termination 78 and underneath track 12. Thus, trolleys can be removed from the end of the elevator rail. The side wall of the elevator rail is cut away at 80 so that a fixed photoelectric detector 82 can respond to the presence or absence of trolleys at the ends of the elevator rails. Photoelectric detector 82 comprises a light source and a photosensitive device responsive to light reflected from trolleys on either of the two parallel elevator rails. As an alternative the light source and photosensitive device can be separate and on opposite sides of the elevator track section. The latter arrangement is desirable where dirty conditions might affect reflectivity.

Rail 30 has a stop 84 at its end, the stop being positioned to engage a trolley wheel when the trolley is directly underneath track 12.

Flanges 70 and 74 meet at point 86, and rail 30 is pivotable about a pivot axis at 88, directly below point 86. Attached to the top of rail 30 is a block 90 having a horizontally extending slot 92 which receives a roller 94, which serves as a cam. The rail is supported against downward pivoting movement by engagement of roller 94 with the upper edge of slot 92, and movement of the roller effects upward and downward pivoting movement of rail 30 about a pivot axis 88. A projection 96 on top of block 90 engages actuator 98 of switch 100, which provides a signal indicating whether or not the elevator track section is horizontal.

Figure 5:
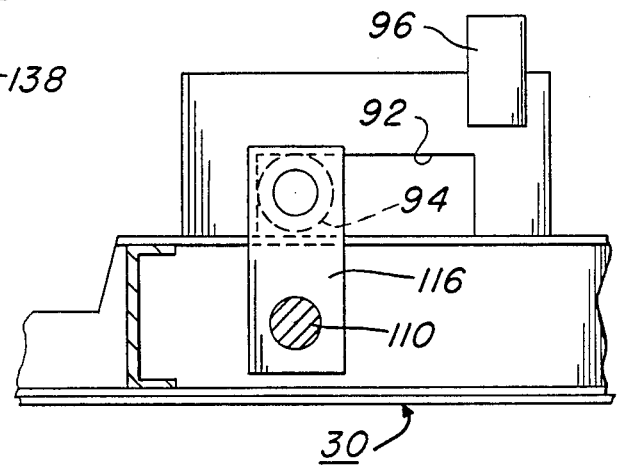
FIG. 5 is a fragmentary elevational view showing a portion of a hydraulically operated can mechanism for lowering the elevator.
Figure 4:
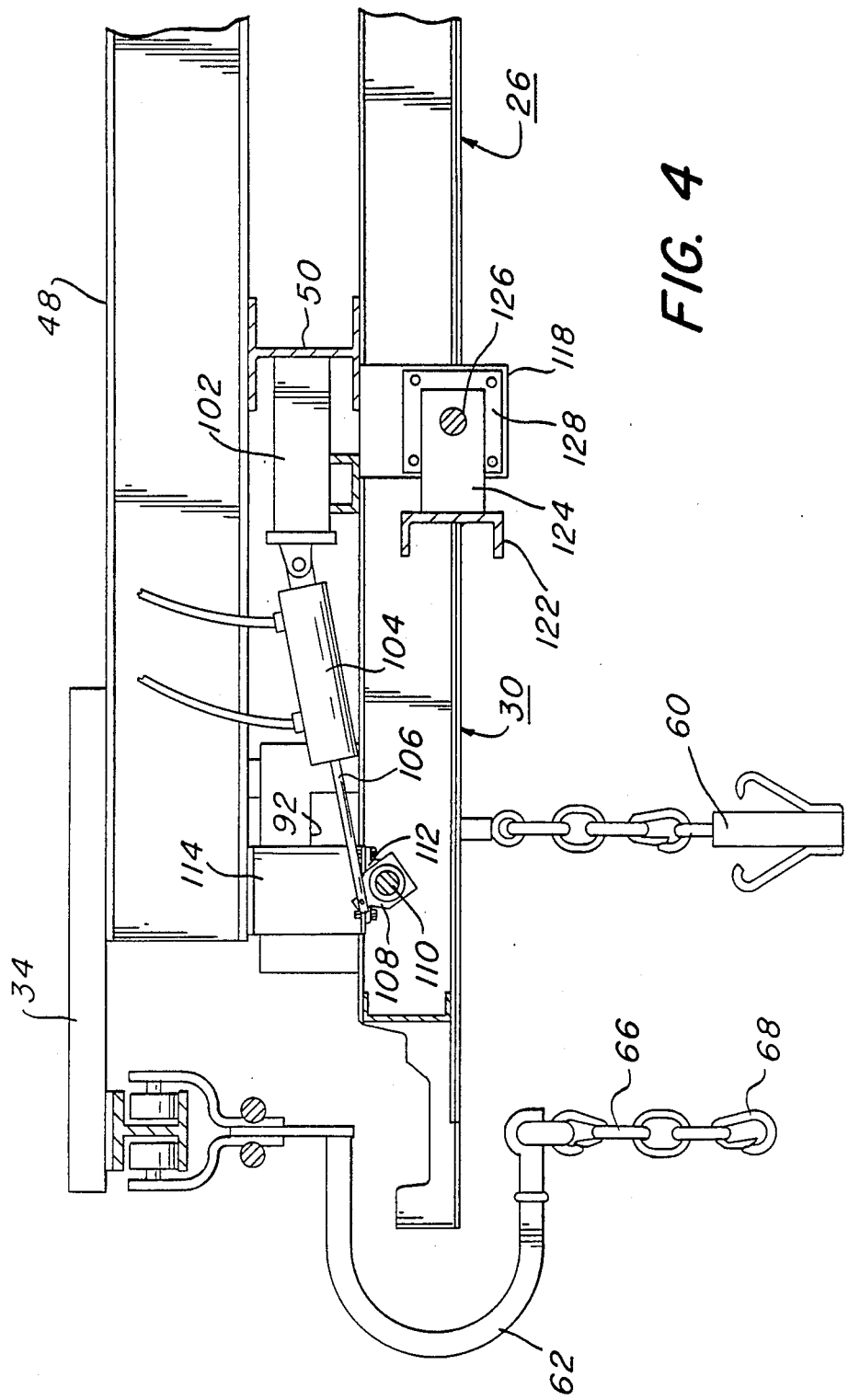
FIG. 4 is a sectional view through a vertical plane between the rails of the load transfer apparatus, showing the opposite side of the elevator section seen in FIG. 2.

A cylindrical base 102, welded at one end to I-beam 50, has a hydraulic cylinder 104 pivoted to its other end for swinging movement in a vertical plane. Piston rod 106 of the cylinder controls movement of roller 94 in a manner which can be understood from FIGS. 4 and 5. Rod 106 is arranged to rotate shaft 110 through crank 108. Shaft 110 is supported horizontally by bearing blocks, one of which is shown at 112 in FIG. 4. Block 112 is supported from beam 48 through bracket 114. As shown in FIG. 5, a plate 116, fixed to shaft 110, holds roller 94. When rail 30 is horizontal, the axis of roller 94 is directly above the axis of shaft 110. When hydraulic cylinder 104 (FIGS. 2 and 4) withdraws rod 106, shaft 110 rotates, causing roller 94 to move downwardly in an arc. This movement allows track 30 to pivot downwardly about pivot axis 88 (FIG. 2). Shaft 110 extends toward the opposite elevator rail 32, as shown in FIG. 1, and rail 32 is provided with its own block and roller mechanism corresponding to block 90 and roller 94.

Pivoting of rail 30 about pivot axis 88 (FIG. 2) is accomplished by means of a pivot mechanism including plate 118, which is welded to rail 26 at weld 120, and channel beam 122, which is welded to rail 30. Channel beam 122 is connected through plate 124 to a shaft 126, which is rotatable in bearing supported on plate 118 in bearing block 128. Shaft 126 and beam 122 extend across the framework toward the point at which rails 28 and 32 meet, where a similar pivoting mechanism is provided. Thus, elevator rails 30 and 32 are secured together by beam 122, and pivot downwardly simultaneously as piston rod 106 is withdrawn into hydraulic cylinder 104.

Figure 3:
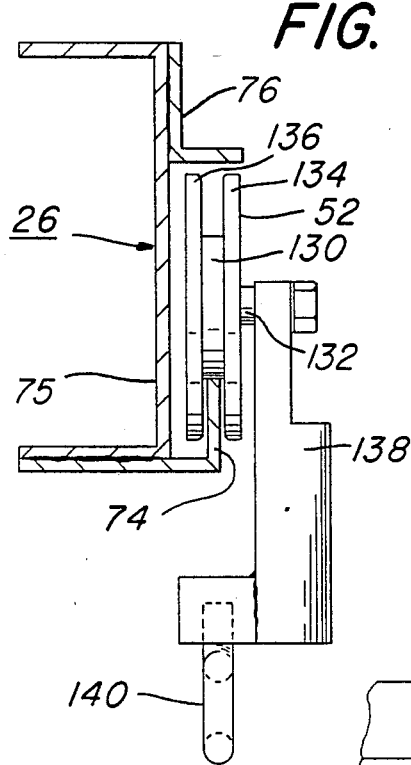
FIG. 3 is a vertical section taken on plane 3—3 of FIG. 2, showing a manually movable trolley and its relationship with a rail of the load transfer apparatus.

An advantageous feature of the load transfer apparatus is the prevention of the manually movable trolleys form accidentally being removed from the track sections of the load transfer apparatus. This is accomplished on elevator rail 26 by the overhead L-shaped flange as shown in FIG. 3, and by similar overhead flanges on the other elevator rail and on the fixed rails. The trolley, is shown in FIG. 3, comprises a wheel 130, which rides on flange 74. The wheel itself has flanges 134 and 136 which are of larger diameter than the wheel, and which extend downwardly on both sides of the upturned portion of flange 74. The distance between the edge of flange 74 and the underside of overhead flange 76 is less than the diameter of flanges 134 and 136. Consequently, the overhead trolley cannot be removed at locations where the overhead flange is present. Trolley 52 comprises a block 138 having a shaft 132 on which wheel 130 is rotatable, and having an eye 140 for attachment of a suspension chain. Eye 140 is located directly underneath wheel 130.

Because of the presence of flanges 134 and 136, in the event of a seriously imbalanced load, these flanges will bind against flange 74, preventing the manually movable trolley from rolling along the rail.

Figure 6:
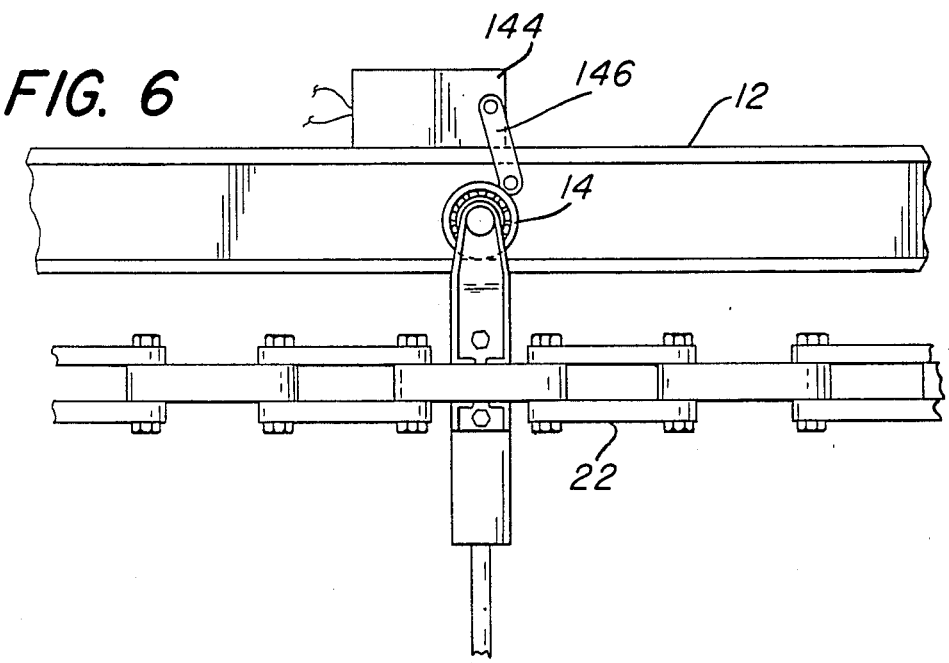
FIG. 6 is a fragmentary elevational view of the power-driven conveyor, showing part of a power-driven trolley, the connecting chain, the track and a positioning switch for stopping the power conveyor trolleys at predetermined positions.

A switch 144, shown in FIG. 1, assist in stopping the power-driven conveyor at a position such that it can be loaded or unloaded by the transfer apparatus. Switch 144 is mounted on power conveyor track 112 as shown in FIG. 6, and has an actuator arm 146 which is engageable by the wheels of the power-driven trolleys. In FIG. 6, a wheel of trolley 14 is shown engaged with actuator arm 146. The switch is shown positioned to be engaged by a power-driven trolley ahead of the trolleys at the transfer location. The switch, however, can be anywhere along the power-driven conveyor so long as it is positioned to be actuated when trolleys are at the transfer location.

Figure 10:
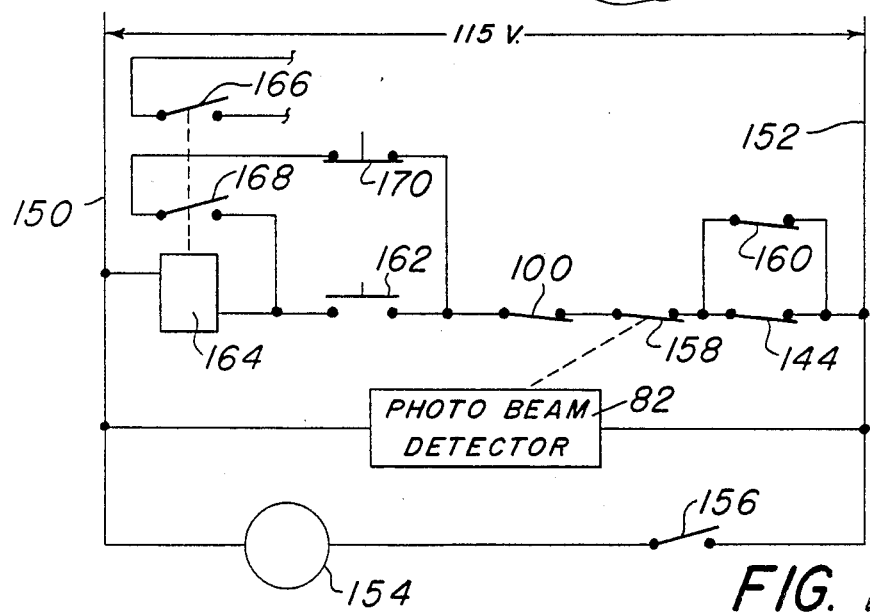
FIG. 10 is a schematic diagram of the electrical controls used in the operation of the transfer apparatus.

The control circuitry associated with the transfer apparatus is depicted in FIG. 10. 115 volt AC power is connected across lines 150 and 152. Photo beam detector 82 is connected and powered through these lines, as is hydraulic pump 154 which supplies hydraulic fluid to cylinder 104. The pump is operated by means of switch 156. The photo beam detector includes a relay, contacts 158 of which are normally closed, but open when a trolley is present at the end of either of the two parallel elevator rails. Switch 100 is closed when the elevator track section is horizontal, but opens whenever the elevator track section pivots downwardly. Either switch 100 or contacts 158, therefore open whenever a trolley, or the elevator track section itself is in a position to interfere with movement of the power-driven conveyor. Switch 100 and contacts 158 are connected in series with switch 144, which is the position switch operated by the power conveyor trolleys. This switch is normally closed, but opens whenever a power conveyor trolley wheel engages actuator 146 (FIG. 6). Switch 144 is bypassed by a normally closed manually operable switch 160. Switch 144, therefore, is normally inoperative to stop the power conveyor. It operates to stop the conveyor only if manual switch 160 is open.

Switches 144, 158 and 100 are connected in series with normally open pushbutton 162 and relay solenoid 164. Normally open contacts 166 of the relay are connected to operate the motor (not shown) driving the power-driven conveyor. Contacts 168 are holding contacts in series with a normally closed pushbutton 170. Contacts 168 and pushbutton 170 are connected across pushbutton 162.

Assuming that the elevator track section is horizontal, and no trolley is at the end of the elevator, switch 100 and photo beam detector contacts 158 are closed. Further assuming that switch 160 is closed, operation of the power-driven conveyor is initiated by momentary closure of pushbutton 162. Relay contacts 168 close and continue delivery of current to solenoid 164 after pushbutton 162 opens. The conveyor can be stopped at any time by momentary operation of pushbutton 170, which releases the holding circuit of the relay.

Assuming that a pair of adjacent power-driven trolleys to be loaded or unloaded is approaching the transfer apparatus, switch 160 is manually opened. The power-driven conveyor continues to operate until the trolley ahead of the trolleys to be loaded or unloaded actuates and opens switch 144. Opening of switch 144 releases the holding circuit of relay 164, and stops the power-driven conveyor at the proper position. The power-driven conveyor can only be restarted by depression of pushbutton 162, and will only continue to operate if switch 160 is closed. The power-driven conveyor cannot be restarted if the elevator track section is pivoted downwardly of if a manually movable trolley is positioned at the end of either rail of the elevator track section.

The mechanical operations taking place in transfer of a load from the transfer apparatus to the power-driven conveyor are depicted in FIGS. 7, 8 and 9. FIG. 7 shows rail 30 pivoted downwardly about pivot axis 88. Trolley 52 is shown approaching the end of rail 30. Load bar 60 is suspended by chain 66 from hanger 62 of the power-driven conveyor. Hook 56 of chain 54 is now slightly lower than hook 68 of chain 66. Hook 56, therefore, can be removed from load bar 60 and trolley 52 taken off the end of rail 30 and placed on fixed horizontal rail 26 either at end 172 or at an intermediate location underneath a gap 174 in overhead flange 72.

FIG. 8 shows the power conveyor approaching a condition in which transfer can take place. The load bar 60 is suspended on trolleys 52 and 44 from fixed horizontal rails 26 and 28 respectively. Power-driven trolley 14 is approaching the location of switch 144.

As shown in FIG. 9, when the roller of trolley 14 engages switch 144, the conveyor stops at a position in which hangers 62 and 176 are between the locations of elevator track sections 30 and 32. The elevator rails are lowered so that suspension chains 66 and 178 of the power-driven trolleys become taut and chains 54 and 180 can be removed from load bar 60. The manually movable trolleys can be removed, and the elevator track section returned to its horizontal condition, whereupon the load suspended from load bar 60 can continue on its way.

It is desirable to use flexible chains on the manually movable trolleys as well as on the power-driven trolleys, because a rigid connection between the manual trolley and the load bar would tend to cause disengagement of the manual trolley from its rail unless special precautions are taken. The flexibility of the chains on the manual trolleys prevents such disengagement from occurring.

Unloading of the power-driven conveyor can be accomplished by pivoting the elevator track sections downwardly, positioning manually movable trolleys at the ends of the elevator track sections, attaching the chains of the manually trolleys to the load, and then raising the elevator track section so that the suspension chains of the power-driven trolleys can be removed from the load bar. The load bar is then suspended from the manually movable trolleys, and can be moved along the elevator track sections toward the fixed horizontal track sections, where the load can be removed from the load bar while the power-driven conveyor continues to operate.

Numerous modifications can be made to the transfer apparatus just described. For example, even though a pivoted track section is very desirable, many of the advantages of the invention can be realized in a transfer apparatus in which the entire movable track section translates upwardly and downwardly while remaining horizontal. It is also possible to realize many of the advantages of the transfer apparatus of the invention in an installation in which a power conveyor carries its load on individual trolleys rather than on pairs of trolleys, in which case it would be possible to use a transfer apparatus having a single rail rather than two parallel rails. Various other modifications can be made both in the mechanical features, and in the electrical controls of the apparatus described without departing from the scope of the invention as defined in the following claims.

I claim:

1. In a power-driven conveyor system comprising a raised conveyor track and a plurality of power-driven work-suspending trolleys movable in succession along said raised conveyor track for carrying work along a path, a load transfer apparatus comprising:
    means for guiding manually movable trolleys in a direction transverse to said path to a position substantially directly above said path, and means for lowering said manually movable trolleys to enable transfer of a load from said manually movable trolleys to the power-driven trolleys to take place;
    whereby transfer can be effected by attaching, to a power-driven trolley, a load carried by a manually movable trolley, lowering the manually movable trolley so that the load is supported by the power-driven trolley and the load on the manually movable trolley is relieved, and then detaching the load from the manually movable trolley.

2. A load transfer apparatus according to claim 1 in which the power-driven conveyor system includes motor means for driving the power-driven work-suspending trolleys, comprising:
    a holding relay circuit comprising a solenoid, a first set of contacts closable and connected to delivery electric current to said motor means when the solenoid is energized, and a second set of contacts closable when the solenoid is energized and connected in series with the solenoid, a normally open momentary start switch connected in series with the solenoid and bypassing the second set of contacts;
    a source of electric current for operating the solenoid; and control switch means connected in series with the source of electric current and the holding relay circuit to deliver current from the source of current to the holding relay circuit, the control switch means comprising a first normally closed conveyor operated switch actuable each time a power-driven work-suspending trolley reaches a position at which transfer of a load from a manually movable trolley on said guide means to a power-driven trolley can take place, and a normally closed, manually operable stop switch connected in parallel with the conveyor operated switch to bypass the conveyor operated switch, whereby the control switch means cuts off current to the holding relay circuit whenever the normally closed conveyor operated switch is actuated while the normally closed manually operable stop switch is open.

3. A load transfer apparatus according to claim 2 in which the control switch means includes an additional normally closed switch connected in series with the parallel combination consisting of the conveyor operated switch and the stop switch, and having means for actuating said additional switch means when the guide means is lowered to enable load transfer to take place.

4. A load transfer apparatus according to claim 2 in which the control switch means includes an additional normally closed switch connected in series with the parallel combination consisting of the conveyor operated switch and the stop switch, and having means for actuating said additional switch whenever a manually movable trolley is located at a position on said guide means at which transfer can take place.

5. A load transfer apparatus according to claim 2 in which the control switch means includes first and second additional normally closed switches connected in series with each other and in series with the parallel combination consisting of the conveyor operated switch and the stop switch, and having means for actuating said first additional switch when the guide means is lowered to enable transfer to take place, and means for actuating said second additional switch whenever a manually movable trolley is located at a position on said guide means at which transfer can take place.

6. A load transfer apparatus according to claim 1 including a plurality of manually movable trolleys, each comprising a trolley wheel having circular flanges on both sides of the wheel, the flanges being of greater diameter than the wheel; and in which the guide means comprises a track extending toward said path and having an edge on which the trolley wheels ride, said edge extending between the flanges on the wheel, and a cover located above said edge and spaced therefrom by a distance less than the flange diameter, the cover extending along at least part of the length of the track and being engageable by at least one of the flanges of the trolley wheel along said part to prevent removal of the trolley wheel from the track at locations where the cover is present, the cover having a gap at an end of the track adjacent to said path and at least at one other location on the track whereby a trolley wheel can be engaged with and removed from the track at said end and at said one other location.

7. In a power-driven conveyor system comprising a raised conveyor track and a plurality of power-driven work-suspending trolleys movable in succession along said raised conveyor track for carrying work along a path, a load transfer apparatus comprising:
 a stationary track section extending substantially horizontally toward a location on said raised path and generally perpendicular to the direction of movement of the power-driven work-suspending trolleys at said location;
 a second track section positionable at an end of said first track section in alignment therewith, and, when in said alignment, extending from said end of the stationary track section toward said path and having an end portion extending underneath said raised conveyor track;
 means for moving said end portion of the second track section downwardly from the position in which said stationary track section and second track section are in alignment;
 manually movable work-suspending trolley means movable along the stationary and second track sections and from the stationary track section to the second track section when the track sections are in alignment;
 work attaching means extending downwardly from the power-driven trolleys;
 work attaching means extending downwardly from the manually movable trolleymeans; and
 a load carrier having means detachably connectable to both of said work attaching means;
 the work attaching means on the power-driven trolleys being flexible and of lengths such that, when the manually movable trolley means is located at said end portion of the second track section and both work attaching means are connected to the load carrier, the end portion of the second track section is movable downwardly through a position in which the weight of the load carrier and any load thereon is tranferred from the manually movable trolley means to the power-driven trolleys;
 whereby transfer of the load carrier from the manually movable trolley means to a power-driven trolley can be effected by attaching the work attaching means extending downwardly from a power-driven trolley to the load carrier while the load carrier is suspended from a manually movable trolley means on the second track section, moving said end portion of the second track section downwardly until the load carrier is supported by the work attaching means extending downwardly from the power-driven trolley and the load on the manually movable trolley means is relieved, and then detaching the load carrier from the work attaching means extending downwardly from the manually movable trolley means.

8. A load transfer apparatus according to claim 7 having means for pivoting the second track section for tilting movement about an axis located at the junction of the first and second track sections, said axis extending horizontally and substantially perpendicular to said track sections, whereby downward movement of said end portion of the second track section is effected by pivoting movement about said axis.

9. A load transfer apparatus according to claim 7 including: motor means for driving the power-riven work-suspending trolleys; conveyor operated switch means actuable each time a power-driven work-suspending trolley reaches a position at which its work attaching means can be connected to a load carrier suspended from a manually movable trolley at said end portion of the second track section; stop switch means manually movable to a stop position; and electrical circuit means, connected to both of said switch means and to the motor means, for stopping the motor means whenever the conveyor operated switch means is actuated while the stop switch means is in the stop position.

10. A load transfer apparatus according to claim 7 in which the power-driven conveyor system includes motor means for driving the power-driven work-suspending trolleys, comprising:
 a holding relay circuit comprising a solenoid, a first set of contacts closable and connected to deliver electric current to said motor means when the solenoid is energized, and a second set of contacts closable whenthe solenoid is energized and connected in series with the solenoid, a normally open momentary start switch connected in series with the solenoid and bypassing the second set of contacts;
 a source of electric current for operating the solenoid; and control switchmeans connected in series with the source of electric current and the holding relay circuit to deliver current from the source of current to the holding relay circuit, the control switch means comprising a first normally closed, conveyor operated switch actuable each time a power-driven work-suspending trolley reaches a position at which its work attaching means can be connected to a load carrier suspended from a manually movable trolley at said end portion of the second track section, and a normally closed, manually operable stop switch connected in parallel with the conveyor operated switch to bypass the conveyor operated switch, whereby the control switch means cuts off current to the holding relay circuit whenever the normally closed conveyor operated switch is actuated while the normally closed manually operable stop switch is open.

11. A load transfer apparatus according to claim 10 in which the control switch means includes an additional normally closed switch connected in series with the parallel combination consisting of the conveyor operated switch and the stop switch, and having mans for actuating said additional switch means when said end portion of the second track section is moved downwardly from the position in which said first and second track sections are in alignment.

12. A load transfer apparatus according to claim 10 in which the control switch means includes an additional normally closed switch connected in series with the parallel combination consisting of the conveyor operated switch and the stop switch, and having means for actuating said additional switch whenever a manually movable trolley is located at said end portion of the second track section, at least when said track sections are in alignment.

13. A load transfer apparatus according to claim 10 in which the control switch means includes first and second additional normally closed switches connected in series with each other and in series with the parallel combination consisting of the conveyor operated switch and the stop switch, and having means for actuating said first additional switch when the end portion of the second track section is moved downwardly from the position in which said first and second track sections are in alignment, and means for actuating said second additional switch whenever a manually movable trolley is located at said end portion of the second track section at least when said track sections are in alignment.

14. A load transfer apparatus according to claim 7 in which: the stationary track section comprises left and right track elements in parallel, spaced relationship; the second track section also comprises left and right track elements in parallel spaced relationship; and left track element of the second track section is positionable in alignment with the left track element is the stationary track section and the right track element of the second track section is positionable in alignment with the right track element of the stationary track section; and the manually movable trolley means comprises at least one trolley located on and movable along a track comprising said left track element and at least one trolley located on and movable along a track comprising said right track elements.

15. A load transfer apparatus according to claim 14 in which the load carrier is an elongated bar having a first pair of attachment means located near opposite ends of the bar and spaced from each other along the length of the bar by a distance substantially equal to the spacing between said right and left track elements, and a second pair of attachment means respectively located adjacent to the attachment means of the first pair, and being spaced from each other along the length of the bar by a distance substantially equal to the distance between successive work-suspending trolleys on said raised conveyor track, the attachment means of the first pair being connectable to work attaching means extending downwardly from work-suspending trolleys of a successive pair on the raised conveyor track, and the attachment means of the second pair being connectable to work attaching means extending downwardly from manually movable trolleys respectively on the left and right track elements.

16. A load transfer apparatus according to claim 7 including power-driven hoist means, situated adjacent to said stationary track section, for lifting a load carrier to a height at which it can be connected to work attaching means extending downwardly from manually movable trolley means situated on the stationary track section.

17. A load transver apparatus according to claim 7 in which each of the manually movable trolley means comprises a trolley wheel having circular flanges on both sides of the wheel, the flanges being of greater diameter than the wheel; and in which each track section has an edge on which the trolley wheel rides, said edge extending between the flanges on the wheel, and a cover located above said edge and spaced therefrom by a distance less than the flange diameter, the cover extending along at least part of the lengths of the stationary track section and the second track section and being engageable by at least one of the flanges of the trolley wheel along said part to prevent removabl of the trolley wheel from the track sections at locations where the cover is present, the cover having a gap at said end portion of the second track section and at least at one location on the stationary track section whereby a trolley wheel can be engaged with and removed from the track sections at said end portion and at said location.

18. A method of loading an overhead conveyor having a plurality of power-driven work-suspending trolleys movable in succession along a raised conveyor track from a stationary storage rack having a movable auxiliary support, each trolley having flexible work attaching means extending downwardly therefrom, comprising the steps of:
temporarily suspending a load from a trolley means of said auxiliary support at a level above the level at which the load would be held by said work attaching means when attached thereto;
temporarily stopping the conveyor;
moving the trolley means and the load laterally on said auxiliary support to a position underneath the path of the power-driven work-suspending trolleys;
connecting said flexible work attaching means to the load;
lowering said auxiliary support and thereby said trolley means, thereby causing the load to descend until the flexible work attaching means becomes taut;
detaching said trolley means from the load; and restarting the conveyor.

* * * * *